United States Patent [19]

Halasa

[11] 3,860,602
[45] Jan. 14, 1975

[54] HYDRAZINIUM SALTS OF MERCAPTOBENZOTHIAZOLE

[75] Inventor: Adel F. Halasa, Akron, Ohio

[73] Assignee: The Firestone Tire & Rubber Company, Akron, Ohio

[22] Filed: July 2, 1971

[21] Appl. No.: 159,464

Related U.S. Application Data

[63] Continuation of Ser. No. 693,072, Dec. 26, 1967, abandoned, which is a continuation-in-part of Ser. No. 502,606, Oct. 22, 1965, abandoned.

[52] U.S. Cl............ 260/306, 260/305, 260/306.6 R
[51] Int. Cl............................................ C07d 91/48
[58] Field of Search...................... 260/306, 306.6 R

[56] References Cited
UNITED STATES PATENTS
2,073,600   3/1937   Bayer et al......................... 260/306

FOREIGN PATENTS OR APPLICATIONS
650,776   3/1951   Great Britain................... 260/306.6

OTHER PUBLICATIONS

Levi, Chemical Abstracts, Vol. 26, pages 1250–1251, (1932), QD1A51.
Smith, Open–Chain Nitrogen Compounds, Vol. 2, (W. A. Benjamin, Inc., N.Y., 1966), pages 120–122, QD412N156.
Elderfield, Heterocyclic Compounds, Vol. 5, (New York, 1957), pages 551, 553, 563, 570, 573–574.
Teppema et al., J. Am. Chem. Soc., Vol. 49, pages 1781–1782 (1927), QD1A5.

Primary Examiner—Alton D. Rollins

[57] ABSTRACT

The invention relates to 2-hydrazinobenzothiazole and its 2'-alkyl derivatives of 1 to 12 carbon atoms and 2'-aryl derivatives, including phenyl, naphthyl, anthracyl, tolyl and xylyl derivatives, and their preparation. The compounds can be produced by either of the following processes:

1. By treating 2-mercaptobenzothiazole with hydrazine or alkyl or aryl hydrazine in the absence of water, as in ether solution, the benzothiazoline-2-thione hydrazinium salt is precipitated. On heating, rearrangement of the salt occurs with liberation of hydrogen sulfide and preparation of the 2-hydrazinobenzothiazole and its 2'-alkyl and 2'-aryl derivatives.

2. By treating 2-mercaptobenzothiazole with hydrazine or alkyl or aryl hydrazine and heating, usually in aqueous solution, hydrogen sulfide is liberated and the 2-hydrazinobenzothiazole and its 2'-alkyl and 2'-aryl derivatives are produced directly.

2 Claims, No Drawings

HYDRAZINIUM SALTS OF MERCAPTOBENZOTHIAZOLE

This application is a streamlined continuation of my application Ser. No. 693,072 filed Dec. 26, 1967, which was a continuation-in-part of my application Ser. No. 502,606 filed Oct. 22, 1965, (both abandoned).

This application contains claims to the process of making the compounds claimed in Halasa 3,388,146 which matured from Ser. No. 504,984 filed Oct. 24, 1965, and a derivative product, as well as claims to the use of the compounds of said patent in the vulcanization of rubber and the process of so using them.

The invention relates to the preparation of 2-hydrazinobenzothiazole and its 2'-alkyl and 2'-aryl derivatives including, for example, 2-(2'-methylhydrazino)benzothiazole and other 2'-mono alkyl derivatives containing 1 to 12 or more carbon atoms; 2-(2',2'-dimethylhydrazino)benzothiazole and other 2'-dialkyl derivatives of 1 to 12 or more carbon atoms; 2-(2'-phenylhydrazino) benzothiazole and other 2'-aryl derivatives, including phenyl, tolyl, xylyl, and naphthyl derivatives, by a one-step and by a two-step process, and includes as a new product the intermediate obtained by the two-step process.

The two processes are illustrated diagrammatically below.

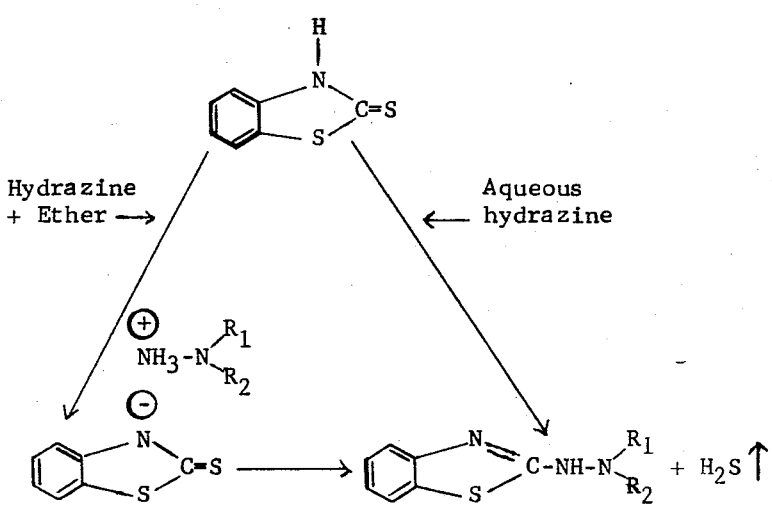

where $R_1$ and $R_2$ can be either H or lower alkyl or aryl.

In the first process, which is the two-step process, 2-mercaptobenzothiazole is treated preferably at room temperature with hydrazine or a 2'-alkyl or 2'-aryl derivative thereof, preferably with ethyl ether or other inert anhydrous solvent in which the salt is insoluble and precipitates. On heating, the hydrazine salt is rearranged and hydrogen sulfide is liberated, yielding the desired hydrazino derivative.

In the second process the intermediate step of producing the salt is eliminated by treating mercaptobenzothiazole with hydrazine (usually aqueous) or a 2'-alkyl or 2'-aryl derivative thereof, and then heating to produce the hydrazino compound directly as hydrogen sulfide is liberated.

In the first process, which is the two-step process, the addition of the hydrazine or hydrazine derivative to form the salt is usually carried out at room temperature. On conversion of the precipitated salt, heat is necessary, and usually a temperature of at least 50°C. will be used and preferably a temperature around 80°–100°C., but temperatures as high as 200°C. may be used to drive off the hydrogen sulfide.

In the second, or one-step process, the conversion with the hydrazine or hydrazine derivative is carried out at a temperature of at least 50°–100°C. to liberate the hydrogen sulfide, but a temperature in the neighborhood of 80°C. is usually employed, and temperatures as high as 200°C. in high-boiling solvents, usually aqueous, may be used.

Usually either process will be carried out at atmospheric pressure, although pressures above and below atmospheric may be employed.

Usually an equimolecular amount of the hydrazine or hydrazine derivative will be utilized. Any excess employed may be recovered and reused, and if an insufficient amount is utilized the excess mercaptobenzothiazole may be recovered and reused.

The compounds are valuable as accelerators of sulfur vulcanization of diene rubbers, namely, natural rubber, polybutadiene, polyisoprene, polybutadiene-polyisoprene, butadienestyrene copolymer, etc.

In the following examples, MBT is used to stand for mercaptobenzothiazole.

EXAMPLE 1

Example of the Two-Step Process

MBT (0.05 mole) in 200 ml. of anhydrous ether and hydrazine 0.056 mole are mixed together with stirring at room temperature. A white precipitate is formed which was identified as the hydrazine salt of benzothiazoline-2-thione. It melted at 130°–135°C. This salt is prepared by mixing hydrazine and 2-mercaptobenzothiazole with or without organic solvents. The above salt (0.025 mole) is dissolved in 50 ml. of water and heated to 80°C. for 24 hours to drive off $H_2S$ and the yield is 60 per cent of 2-hydrazinobenzothiazole which precipitates as a white solid. Melting point: 189°–193°C.

EXAMPLE 2

Example of the One-Step Process

MBT (0.1 mole) in water and hydrazine (0.2 mole) are refluxed for 24 hours. A white precipitate is formed which was identified as 2-hydrazinobenzothiazole. On recrystallization from ethyl alcohol it melted at 189°–193°C.

Instead of refluxing, any temperature between about 90° and 120°C. may be used in water solution. Other solvents, such as high-boiling alcohols, ethers, hydrocarbons, hydrazine and hydrazine derivatives, etc., may be used at an appropriate temperature. Temperatures up to about 200°C. may be used. The concentration of the MBT may vary between 5 and 85 per cent or thereabout. By using an excess of hydrazine an improved yield is obtained.

The value of the accelerator in sulfur vulcanization, in comparison with commercial accelerators, was determined by testing in emulsion-formed butadiene-styrene copolymer (GR-S), with the results recorded in the following tables.

The rubber was compounded as follows:

| | | |
|---|---|---|
| GR-S | 100 | parts by weight |
| HAF Black | 50 | do. |
| Zinc Oxide | 3.0 | do. |
| Stearic Acid | 2.0 | do. |
| Phenyl-beta-naphthylamine | 0.6 | do. |
| Oil | 8.0 | do. |
| Total | 163.6 | do. |

This was mixed with 2.0 parts of sulfur and 1.2 parts of 2-hydrazinobenzothiazole and cured. The results which show low scorch, are recorded in the following table.

TABLE I

| CEPAR PARAMETERS:* | TEST |
|---|---|
| Time to 90% Cure, 340° F., min. | 10.8 |
| Cure Constant K | 0.336 |
| Mooney Scorch at 265° F.: | |
| Ts (Vm + 1) | 22.5 |
| Tc (Vm + 10) | 37.5 |
| Vm | 26.0 |

*The CEPAR Apparatus II, by Claxton et al., RUBBER WORLD 143, 71, May 1961.

Samples were then cured for 300°F. at 20 and 40 minutes and the following values were obtained:

TABLE II

| | TIME | TEST |
|---|---|---|
| Physical Properties: | | |
| 300% Modulus, psi. | 20 | 500 |
| | 40 | 1750 |
| 400% Modulus, psi. | 20 | 750 |
| | 40 | 1850 |
| Tensile Strength, psi. | 20 | 1450 |
| | 40 | 2175 |
| Elongation, % | 20 | 640 |
| | 40 | 440 |

Samples were then cured at 340°F. for different periods of time indicated in the table, with the following results:

TABLE III

| | TIME* | TEST |
|---|---|---|
| Physical Properties: | | |
| 300% Modulus, psi. | 6 | 900 |
| | 12 | 1450 |
| | 24 | 1750 |
| 400% Modulus, psi. | 6 | 1425 |
| | 12 | 2150 |
| | 24 | — |
| Tensile Strength, psi. | 6 | 1975 |
| | 12 | 2325 |
| | 24 | 2275 |
| Elongation, % | 6 | 520 |
| | 12 | 410 |
| | 24 | 370 |

*Minutes.

The 2-hydrazinobenzothiazole had the advantage of fast curing.

By sulfur vulcanization is meant the curing of rubber by reaction with either free sulfur or a vulcanizing agent of the sulfur-donor type. Known agents of the latter type include the various phenol polysulfides including the alkyl derivatives thereof, the xanthogen polysulfides, the thiuram disulfides and polysulfides, various amine sulfides including dialkylamine polysulfides and reaction products of primary amines with excess sulfur. One or more accelerator activator is often used with any of the accelerators mentioned, and such activators include the various derivatives of guanidine known in the rubber art, amine salts of inorganic and organic acids, various amines themselves, alkaline salts such as sodium acetate and the like, as well as other activators known to the art. Additionally, two or more accelerators or accelerator combinations are sometimes desirable in a single rubber compound. Although vulcanization is usually accomplished by heating a vulcanizable rubber composition at a temperature in the range of 240° to 400°F. for a time ranging from several hours to a few seconds, vulcanization of a suitably activated rubber composition does take place at lower temperatures such as at room temperature. For example, a latex film containing a sulfur curing agent and an activated ultra accelerator can be cured by allowing the film to remain at room temperature for several hours or a few days.

Any suitable amount of the accelerator will be used, depending upon the rubber and the use to which the rubber is to be put.

The benzothiazoles derived from the alkylhydrazines such as methyl hydrazine, ethyl hydrazine, etc. are equally effective.

I claim:

1. A compound

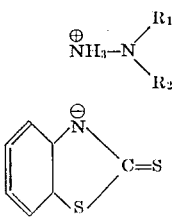

in which $R_1$ and $R_2$ are each either hydrogen or alkyl groups containing 1 to 12 carbon atoms or phenyl, tolyl, xylyl or naphthyl.

2. The compound of claim 1 in which both $R_1$ and $R_2$ are hydrogen.

* * * * *